(12) United States Patent
Remue

(10) Patent No.: US 6,310,317 B1
(45) Date of Patent: Oct. 30, 2001

(54) LASER BEAM GUIDE

(75) Inventor: Gilbert Remue, Aalter (BE)

(73) Assignee: Lillbacka Jetair Oy, Kauhava (FI)

( * ) Notice: Subject to any disclaimer, the term of this patent is extended or adjusted under 35 U.S.C. 154(b) by 0 days.

(21) Appl. No.: 09/433,966

(22) Filed: Nov. 4, 1999

(51) Int. Cl.[7] .................................................. B23K 26/00

(52) U.S. Cl. .............................. 219/121.67; 219/121.78; 74/89.2

(58) Field of Search ........................... 219/121.6, 121.67, 219/121.74, 121.78, 121.79; 74/89.2; 185/39

(56) References Cited

U.S. PATENT DOCUMENTS

| 3,612,814 | * | 10/1971 | Houldcroft | 219/121.67 |
| 4,973,819 | * | 11/1990 | Thatcher | 219/121.78 |
| 5,051,558 | | 9/1991 | Sukhman . | |
| 5,854,460 | | 12/1998 | Graf et al. . | |
| 5,915,823 | * | 6/1999 | Simon | 362/147 |

FOREIGN PATENT DOCUMENTS 1 010 446   8/1998  (BE) .

* cited by examiner

Primary Examiner—Samuel M. Heinrich
(74) Attorney, Agent, or Firm—Louis Woo

(57) ABSTRACT

To ensure that a laser beam is not disturbed during its transmission for the laser generator to a laser cutting head, the laser beam is conveyed along a beam guide enclosure. One side of the beam guide has an opening channel which is covered by a cover sheet that is slidably movable along substantially the length of the open channel. An aperture is formed on the cover sheet, and a conduit connects the aperture to the laser cutting head assembly. A reflective mirror is mounted relative to the conduit and is movable along the axis of the laser beam so as to intercept the laser beam and reflect it through the conduit to the laser cutting head assembly. The cover sheet is made of a flexible material that is impervious to either the laser beam itself or the heat generated by the laser beam. Rollers are provided at both ends of the cover sheet to from respective coils of the cover sheet so as to take up any slack. The cover sheet is slidably moved along the open channel of the beam guide due to the aperture being moving in lockstep with the movement of the laser cutting head assembly.

25 Claims, 4 Drawing Sheets

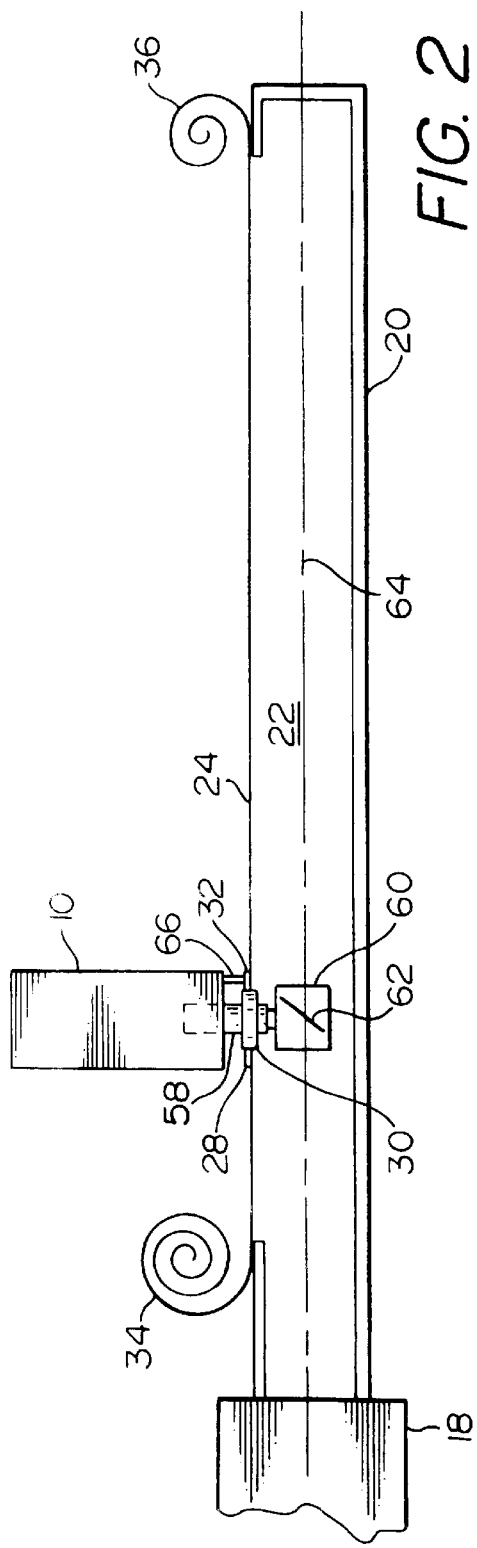
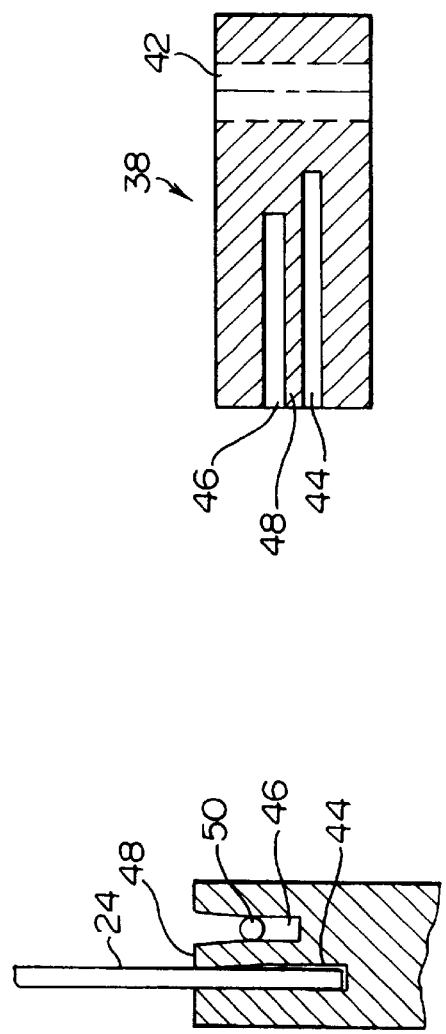

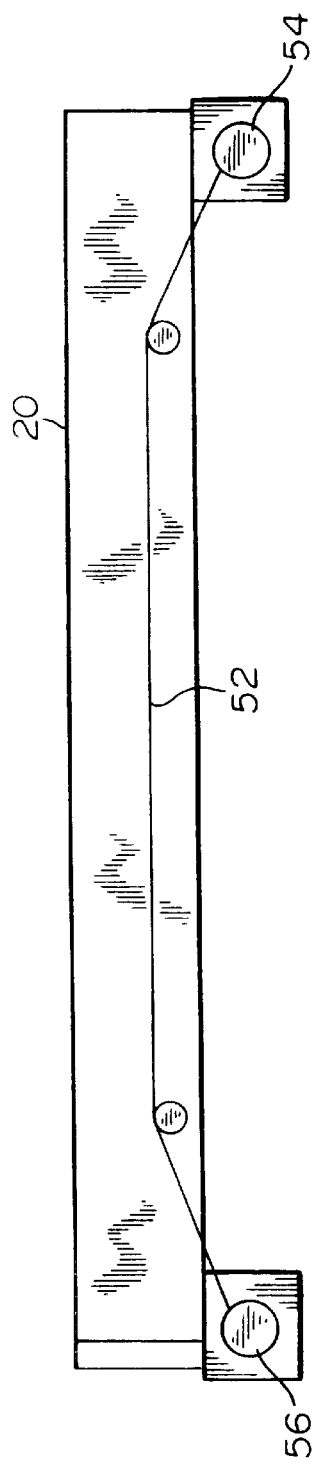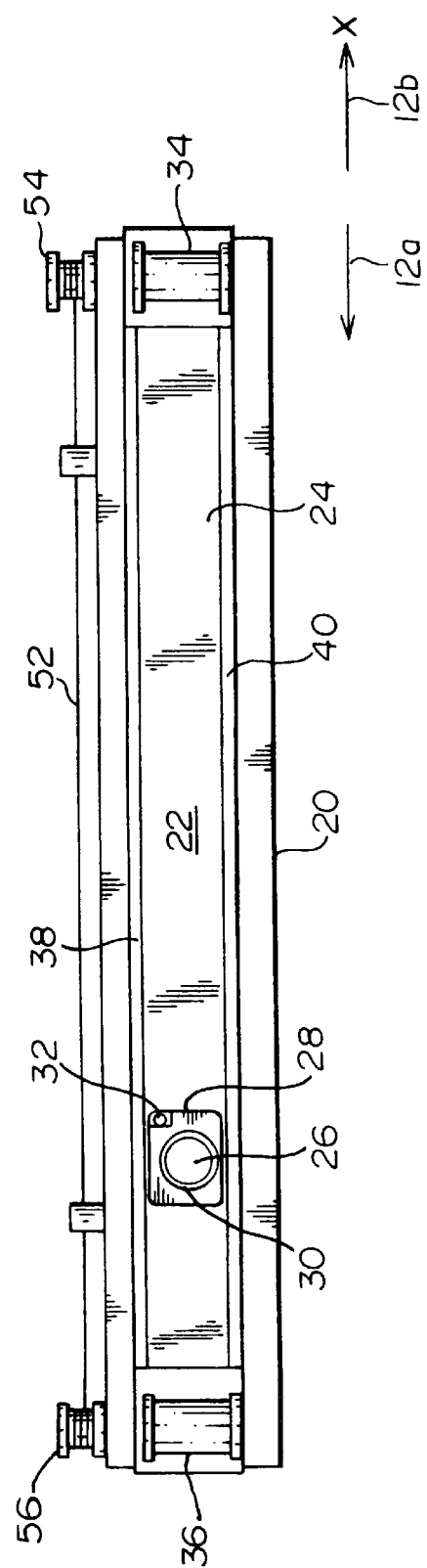

LASER BEAM GUIDE

CROSS REFERENCE TO RELATED APPLICATIONS

This application is related to the following applications assigned to the same assignee of the instant invention and which were filed on Jul. 23, 1999: 09/359,389, 09/359,390, 09/359,392 09/360,496, 09/360,497, 09/360,518, 29/108, 195, 29/108,196 and 29/108,197.

FIELD OF THE INVENTION

The present invention relates to laser cutting machines and more particularly to a laser cutter where the laser cutting head is mounted to the underside of a cross beam and how the laser beam generated from the laser beam generator can be accurately conveyed to such cutting head.

BACKGROUND OF THE INVENTION

Most laser cutting machines of the gantry type utilize bellows type covers for protecting the mechanism that supports and drives the laser cutting head carriage. One such system is disclosed in U.S. Pat. No. 5,854,460. However, the use of such bellows type cover for enclosing a laser beam guide tends to have detrimental effects on the accuracy of the laser beam. This is due to the fact that such bellows type cover in essence acts the same as an accordion so that, when the laser head carriage moves, some portions of the cover would compress while other portions of it would expand. And when that happens, a vacuum is created inside the beam guide so that dirt and dust tend to be sucked into the beam guide. Such dirt and dust then create a disturbance to the laser beam, and therefore affect its accuracy.

To overcome such shortcomings, a new type of beam guide that allows the laser cutting head to freely move and yet at the same time not create any vacuum is needed.

SUMMARY OF THE INVENTION

The laser beam guide of the instant invention has a guide tube that extends from the laser beam generator. An open channel is formed on the side of the guide channel that faces the carriage that carries the laser cutting head movably mounted to the underside of the cross beam of the laser machine. The channel opening is covered by a sheet of flexible non-magnetic ferrous or synthetic material that includes for example a stainless steel metallic plate or a Teflon-fiberglas roll or mat, respectively. The cover sheet is movably fitted to an upper bracket and a lower bracket mounted to the upper edge and the lower edge, respectively, of the opening of the tubular beam guide, with each end of the cover sheet forming a coil that is spring biased at the respective ends of the tubular guide. An aperture is formed approximately at the middle portion of the cover sheet, so that, as the cover sheet is slidably moved along the tubular guide, the aperture is moved therealong.

A connection mechanism, preferably in the form of a tube or conduit, connects the aperture at the cover plate with the laser cutting head mounted to the underside of the cross beam of the laser cutter machine. Since the cross beam is positioned in parallel to the tubular beam guide, as the laser cutting head is moved along the longitudinal axis of the cross beam, by means of the conduit that connects it to the aperture of the cover sheet, the cover sheet, and particularly the aperture thereof, is moved in lockstep with the laser cutting head.

A reflecting mechanism such as for example a laser mirror is positioned inside the tubular guide so as to move along the path of the laser beam. The reflective mirror is further positioned relative to the aperture so that as it moves along the inside of the tubular guide, it intercepts the laser beam and reflects it through the conduit to the laser cutter head. Additional reflecting mechanisms in the laser cutting head redirect the thus reflected laser beam to the tip of the cutting head so as to fabricate a sheet of material placed thereunder on the worktable of the laser cutting machine.

Inasmuch as the non-magnetic ferrous material or non-magnetic synthetic material cover sheet is slidably moved along the open channel of the tubular guide with the respective end coils thereof providing any additional or taking in any excess of the cover sheet, a stable environment is maintained within the inside of the tubular guide. Thus, no vacuum is created inside the tubular guide by the movement of the cover sheet. Accordingly, no dirt or dust is suctioned into the tubular guide to create any disturbance to the laser beam. The laser beam reflected by the mirror to the laser head accordingly stays focused, with no substantial loss of power.

It is therefore an objective of the present invention to provide a guide for a laser beam that does not create any vacuum as the laser beam is being reflected out of the beam guide to a laser cutting head.

It is another objective of the present invention to provide a laser beam guide that is readily adaptable to be used with a laser cutting head that is movably mounted to the underside of a cross beam of a laser cutting machine.

BRIEF DESCRIPTION OF THE DRAWINGS

The above-mentioned objectives and advantages of the present invention will become apparent and the invention itself will be best understood by reference to the following description of an embodiment of the invention taken in conjunction with the accompanying drawings, wherein:

FIG. 2 is an semi-exposed top view of the guide beam of the instant invention;

FIG. 3 is a side view of the guide beam of FIG. 2 with the aperture of the cover sheet particularly shown;

FIG. 4 is a top view of the guide beam of FIG. 3;

FIG. 5 is a cross-sectional view of the mechanism that couples the cover sheet to the open channel of the guide beam of the instant invention;

FIG. 6 is a cross-sectional view of the grooves of the mounting mechanism of FIG. 4 with a portion of the cover sheet being shown to be movably inserted into one of the grooves of the mounting mechanism.

DETAILED DESCRIPTION OF THE INVENTION

Figure 1:
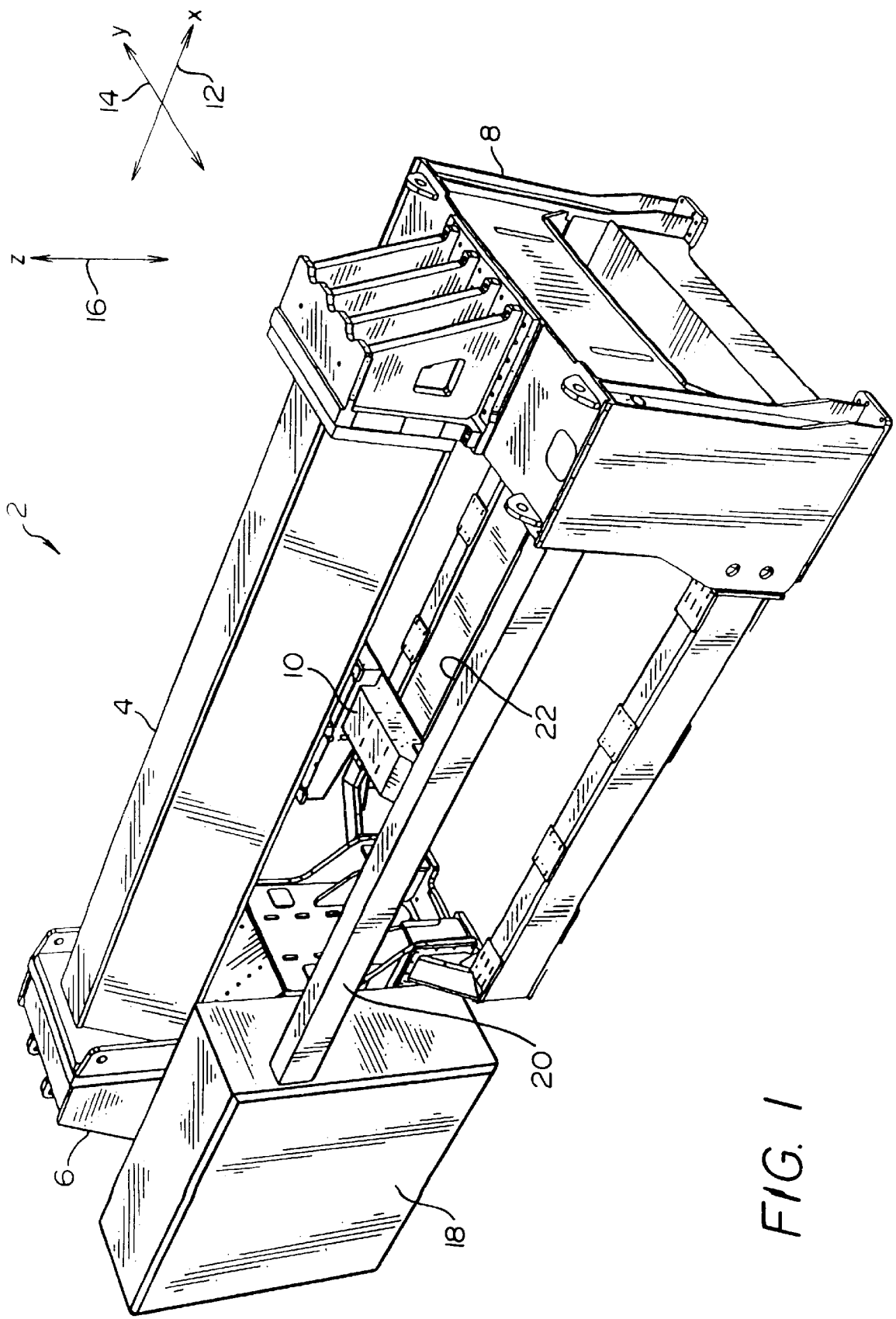
FIG. 1 is a perspective view of a laser cutting machine that has incorporated thereto the beam guide of the instant invention.

With reference to FIG. 1, a laser cutting machine 2 such as that described in the aforenoted related applications, the respective disclosures of which being incorporated by reference herein, is shown. Such laser cutting machine has an upper cross beam 4 mounted above two side supports 6 and 8. Mounted underneath the lower surface of cross beam 4 is a cutting head assembly 10 which movement is effected by driving mechanisms such as linear drives (not shown) mounted to the underside of cross beam 4. As has been fully described in the aforenoted incorporated by reference applications, the laser cutting head that is mounted to laser assembly 10 in turn is driven by servomechanisms positioned in laser cutting head assembly 10. Consequently, the laser cutting head is movable in both the x and y directions as indicated by directional arrows 12 and 14, respectively. In addition, by means of another servomechanism, the laser cutting head can be moved in a z direction as indicated by directional arrows 16.

To generate the laser beam for fabricating a worksheet, a laser generator (not shown but described in the aforenoted referenced applications) is provided inside a laser generator housing 18 that is positioned adjacent to side support 6 of laser machine 2. An enclosure in the form of a tubular guide 20 extends from housing 18 in parallel relationship to cross beam 4. The other end of beam guide 20 is secured to side support 8. As best illustrated in FIG. 1, tubular beam guide 20 consists of a tube that is rectangular in the exemplar embodiment shown. Of course, beam guide 20 can have other tubular configurations. In any event, tubular beam guide 20 has one of its sides, namely the side that faces laser cutting head assembly 10, open. Thus, an open channel 22 extends substantially along the length of beam guide 20.

A semi-exposed plan view of beam guide 20 is illustrated in FIG. 2. As shown, movably mounted over open channel 22 is a cover sheet 24 which may be made of a non-magnetic ferrous material such as for example stainless steel. Alternatively, a non-magnetic synthetic material, such as for example a Teflon-fiberglas based roll or mat, or other kinds of materials that are resistant to the heat from the laser beam traversing inside beam guide 20 may also be used.

As best shown in FIG. 3, cover sheet 24 has an opening or aperture 26 at a particular location thereat. To ensure rigidity, a mount piece 28 is formed over aperture 26. A gasket, preferably made of rubber or other sealing material, is fitted to the edge of aperture 26. Also formed in mount piece 28 is a guide hole 32.

Insofar as cover sheet 24 is flexible, to ensure that it maintains some rigidity so as to prevent vacuum from being created inside guide beam 20 as cover sheet moves along the x direction, the respective ends of cover sheet 24 are rolled into corresponding coils 34 and 36. Thus, as aperture 26 is moved along the x direction, depending on which way aperture 26 is being moved, the respective portions of the cover sheet at coils 34 and 36 will correspondingly coil or uncoil so as to increase or decrease the number of rolls thereat. For example, if aperture 26 were to move in the direction as indicated by directional arrow 12a, then roll 36 would coil so as to roll up the excess portion of cover sheet 24 that is being moved. At the same time, coil 34 uncoils so as to release the requisite amount of cover sheet 24 for maintaining coverage of opening 22. Conversely, if aperture 26 were to move in the direction as indicated by directional arrow 12b, then coil 34 would coil so as to form additional rolls thereat while coil 36 would uncoil. Cover sheet 24 therefore continuously cover channel opening 22.

To ensure that cover sheet 24 tightly covers opening 22, an upper mounting member 38 is fixedly coupled to the edge of beam guide 20 that forms the upper edge of opening 22. Similarly, a lower mounting member is fixedly coupled to the edge of beam guide 20 that forms the lower periphery of opening 22. These upper and lower mounting members 38 and 40 are each made from a plastic material such as for example Ertalan and are shown cross-sectionally in FIG. 5.

Insofar as both upper mounting member 38 and lower mounting member 40 are the same, for the sake of simplicity, only upper mounting member 38 is shown in FIG. 5.

In particular, mounting member 38 has a notch 42 that allows it to be matingly coupled to the edge of beam guide 20 that forms the upper periphery of open channel 22. Mounting member 38 also has a first groove 44 and a second groove 46 separated by a mid section 48. Once mounting member 38 is fixedly mounted to the upper edge of beam guide 20 that forms the upper periphery of open channel 22, cover sheet 24 is slidably inserted into first groove 44. To provide the requisite friction for maintaining cover sheet 24 in groove 44, a rod 50 that may be made of rubber and which has a sufficient cross-sectional dimension is inserted into groove 46 to thereby bias mid-section 48 against cover sheet 24. The biasing force applied by mid-section 48 against cover sheet 24 is such that cover sheet 24, or more accurately an edge thereof, is held sufficiently sealingly tight within groove 44 so as to prevent the laser beam from escaping from beam guide 20 and yet at the same time provide sufficient slack to enable cover sheet 24 to move relative to groove 44.

Refer to FIGS. 3 and 4. To maintain coils 34 and 36 in tension, a wire 52 is wound about spindles 54 and 56. Spindles 54 and 56 in turn are connected to the rollers that hold coils 34 and 36, respectively, of cover sheet 24. Thus, by keeping a certain pretension in wire 52, slacks are taken out from coils 34 and 36.

The coupling of laser cutting assembly to beam guide 20 is best illustrated with reference to FIG. 2. As shown, a tube or conduit 58 extends from laser cutting head assembly 10 to mate with aperture 26, and to extend into beam guide 20. By means of gasket 30, tube 58 forms a seal tight relationship with cover sheet 24. Coupled to tube 58 is a mirror assembly 60 that has its laser mirror 62 in alignment with the laser beam output from the laser generator that travels along the axis designated as 64. Mirror 62 is positioned relative to tube 58 so that it reflects the intercepted laser beam to tube 58, and therefore to laser assembly 10. The redirecting the laser beam in laser cutting head assembly 10 to the laser cutting head is described in the above-referenced application and therefore will not discussed herein. To effect movement of tube 58 and therefore the sliding movement of cover sheet 24 along open channel 22, a guide pin 66 matingly couples laser cutting head assembly 10 to mounting plate 28 by means of guide hole 32. Thus, as laser cutting head assembly 10 is driven along cross beam 4, tube 58 is moved in lockstep therewith. At the same time, cover sheet 24 is slidably moved with coils 34 and 36 to provide or take up the slack at either ends of cover sheet 24.

The same principle with which beam guide 20 is covered by cover sheet 24 to reduce the possibility that dust and dirt may be sucked into beam guide 20 is equally applicable to the movement of laser head assembly 10 and the movement of the laser head relative to laser head assembly 10. As shown in the perspective view of laser cutting machine 2 of FIG. 7, laser cutting head assembly 10 is mounted to the underside 68 of cross beam 4. As was mentioned previously, the movement of laser cutting head assembly 10 is effected by servomechanisms such as for example linear drives (not shown) that are mounted to the underside of cross beam 4. To prevent dirt from accumulating onto the linear drives, a cover sheet 70, which may be made of the same material and work the same way as previously described, is superposed over underside 68 so as to isolate the linear drive mechanisms from the dust and dirt. Alternatively, a bevel-like cover may also be used. It is possible to use bevel-like cover 70 in this instance because there is a sufficient large opening at both ends of cross beam 4 to which laser cutting head assembly 10 would never reach so that there is scant possibility that a vacuum could be created in cross beam 4.

Figure 7:
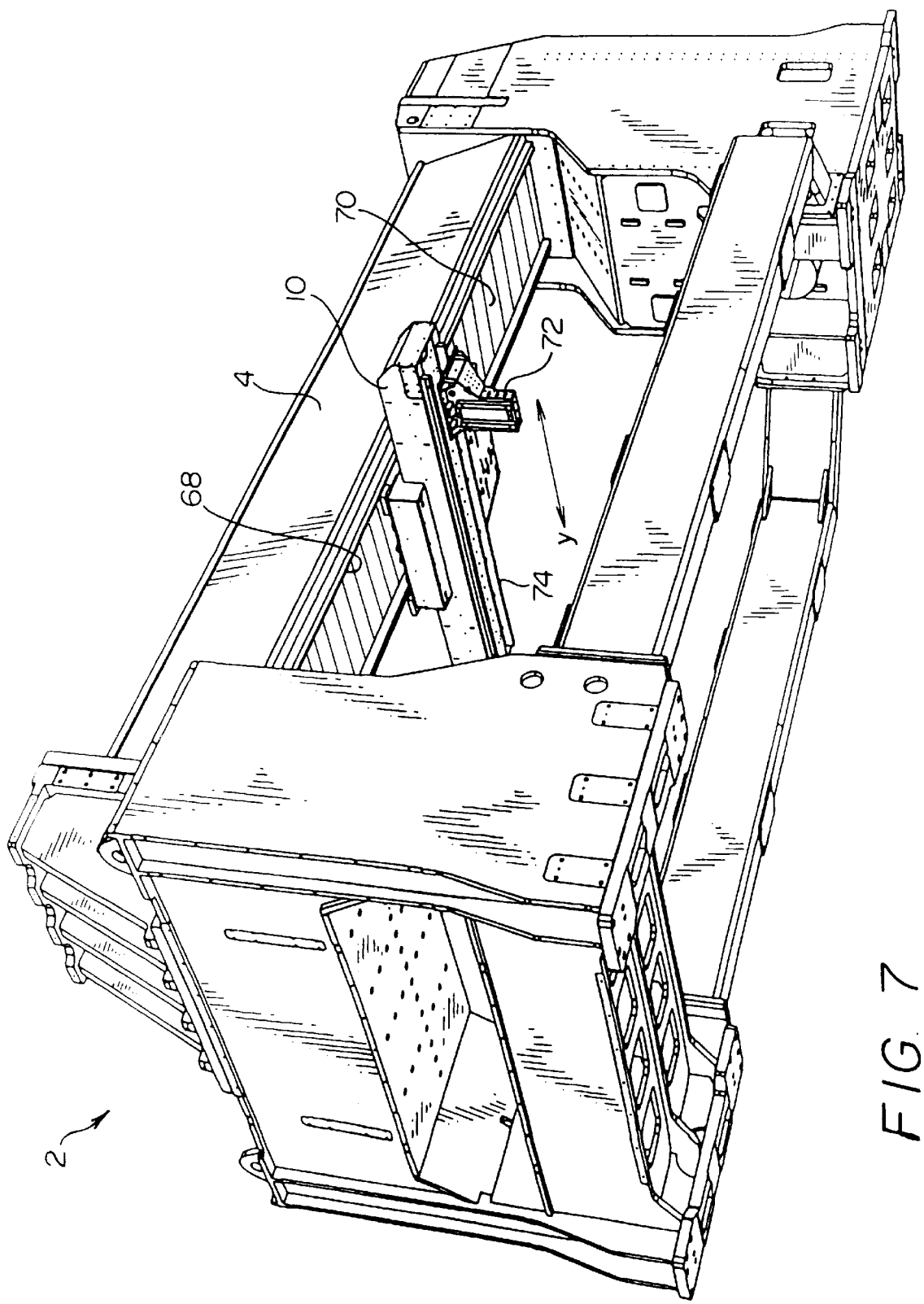
FIG. 7 is a perspective view of the laser cutting machine of the instant invention illustrating with particularity the underside of the cross beam to which the laser cutting head is movably mounted.

As further shown in FIG. 7, a laser cutting head 72 is mounted under laser cutting head assembly 10 for movement along the y direction as indicated. Insofar as laser cutting head 72 is also driven by a linear drive mechanism such as 74, to insulate that linear drive mechanism from exposure to dust and dirt, a cover that operates by using the same principle as discussed previously may also be placed over drive mechanism 74. In FIG. 7, for the sake of simplicity, beam guide 22 and laser generator housing 18 are not shown.

Inasmuch as the present invention is subject to many variations, modifications and changes in detail, it is intended that all matter described throughout this specification and shown in the accompanying drawings be interpreted as illustrative only and not in a limiting sense. Accordingly, it is intended that the invention be limited only the spirit and scope of the hereto appended claims.

What is claimed is:

1. In combination, guide means for providing a path along which a laser beam traverses, a cover movable relative to said guide means, said cover having an aperture through which said laser beam is passable out of said guide, means for connecting said aperture to a laser cutting head so as to enable said laser beam to be output from said cutting head, said aperture movable with the movement of said cutting head along a travel length so that said laser beam continues to be directed to said cutting head irrespective of where along said travel length said cutting head has moved to.

2. Combination of claim 1, further comprising:
   a laser resonator for generating said laser beam;
   wherein said guide means comprises a tube extending along substantially the entire travel length of said cutting head; and
   wherein said cover comprises a sheet of non-magnetic ferrous material covering at least the portion of said tube relative to which said cutting head moves.

3. Combination of claim 1, wherein both ends of said cover sheet are rolled into respective coils; and
   wherein as said cover is moved relative to said guide means, one of said respective coils unrolls while the other of said coils increases the number of rolls thereat so that the length of said cover relative to said travel length remains constant.

4. Combination of claim 1, further comprising:
   at least one mounting means positioned along the length of said guide means, said cover being movably secured to said mounting means so that the movement of said cover is confined with respect to said guide means.

5. Combination of claim 4, wherein said guide means comprises a tube; and
   wherein said mounting means comprises a section coupled longitudinally to said tube, said section having at least one groove extending longitudinally along substantially the entire length thereof, said cover being movably fitted edgewise into said groove so as to be movable relative to said section, said groove providing sufficiently seal tight contact with said section for confining said laser beam within said tube.

6. Combination of claim 5, wherein said section further includes an other groove formed substantially in parallel to said one groove so that a mid-section is formed between said grooves, said combination further comprising:
   a body of a sufficient cross sectional dimension fitted into said other groove to force said mid-section towards said one groove to thereby sealingly hold the edge of said cover within said one groove to prevent said laser beam from escaping from said tube but yet with enough slack to allow said cover to move relative to said one groove.

7. Combination of claim 1, further comprising:
   two mounting sections each positioned longitudinally along said guide means, said mounting sections being spaced from each other for accepting said cover therebetween, each edge of said cover movably secured by a corresponding one of said mounting sections so that said cover is movable between said mounting sections relative to said guide means.

8. Combination of claim 1, further comprising:
   a rubber gasket mounted to said aperture for providing a seal tight passage through which said laser beam passes.

9. Combination of claim 1, further comprising:
   a mirror mounted relative to said connecting means and movable along the path of said laser beam for redirecting said laser beam from said guide means to said cutting head through said connecting means.

10. In a system having a cross beam along which underside a laser cutting head is movably mounted, a laser generator for outputting a laser beam along a guide means having a longitudinal axis substantially parallel to said cross beam, an assembly for directing said laser beam from said guide means to said cutting head, comprising:
    a cover for said guide means, said cover movable along the length of said guide means;
    an aperture formed on said cover for establishing a passage between the inside and outside of said guide means;
    means for connecting said guide means via said aperture of said cover to said cutting head, said connecting means being in lock step movement with said cutting head relative to said axis; and
    means for routing said laser beam from said guide means to said cutting head via said connecting means;
    wherein, as said cutting head is moved along said cross beam, said connecting means moves synchronously therewith so that said laser beam is routed from said guide means to said cutting head for output therefrom.

11. Assembly of claim 10, wherein said cover comprises a sheet of non-magnetic ferrous material, both ends of said cover sheet being rolled into respective coils, one of said respective coils unrolling while the other of said coils rolling in unison as said cover is moved relative to said guide means.

12. Assembly of claim 10, further comprising:
    a rubber gasket fitted about said aperture to provide a seal tight passage through which said laser beam passes.

13. Assembly of claim 10, further comprising:
    at least one mounting means positioned along the length of said guide means, said cover being movably secured to said mounting means for confining the movement of said cover relative to said guide means.

14. Assembly of claim 13, wherein said mounting means comprises a section longitudinally coupled to said guide, said section having at least one groove extending longitudinally along substantially the entire length thereof, said cover being movably fitted edgewise into said groove so as to be movable relative to said section, said groove providing sufficiently seal tight contact with said body for confining the movement of said laser beam within said tube.

15. Assembly of claim 14, wherein said section further comprises an other groove formed substantially in parallel to said one groove so that a mid-section is formed between said grooves, said assembly further comprising:

a body of a sufficient cross section fitted into said other groove to force said mid-section towards said one groove to thereby sealingly hold the edge of said cover within said one groove to prevent said laser beam from escaping from said tube but yet with enough slack to allow said cover to move relative to said one groove.

16. Assembly of claim 10, further comprising:

two mounting sections each positioned longitudinally along said guide means, said mounting sections being spaced from each other for accepting said cover therebetween, each edge of said cover movably secured by a corresponding one of said mounting sections so that said cover is movable between said mounting sections relative to said guide means.

17. Assembly of claim 10, wherein said routing means comprises a mirror positioned relative to said connecting means along the length of said guide means for reflecting said laser beam from said guide means to said cutting head through said connecting means.

18. Assembly of claim 10, wherein said connecting means comprises a tube.

19. Assembly of claim 10, further comprising:

a bellows type cover for protecting the underside of said cross beam, said bellows type cover having a bore wherethrough said laser cutting head extends, said bore being slidably movable with said laser cutting head as respective portions of said bellows type cover compresses and expands.

20. A beam guide comprising:

an enclosure means extending along a first direction for establishing a path to route a laser beam;

an opening formed substantially along the length of said enclosure means;

cover means including an aperture slidably movable over said opening along the length of said enclosure means; and reflecting means movable along the path of said laser beam and positioned relative to said aperture for intercepting said laser beam and rerouting said laser beam through said aperture.

21. Beam guide of claim 20, further comprising:

conduit means sealingly fitted to said aperture for establishing a connection between said enclosure means and a laser cutting head, said reflecting means routing said laser beam from said enclosure means to said cutting head via said conduit means, said conduit means movable in lock step with the movement of said laser cutting head along said first direction.

22. Beam guide of claim 20, further comprising:

mounting means extending along the length of said enclosure means relative to said opening, said cover means being slidably fitted to said mounting means so that the movement of said aperture is confined to along the length of said opening.

23. Beam guide of claim 22, wherein said cover comprises a sheet of non-magnetic ferrous material which ends are rolled into respective coils; and wherein, as said sheet is moved along said mounting means, one of said respective coils unrolls while the other of said respective coils increases the number of rolls thereat so that the length of said sheet relative to said opening remains constant.

24. Beam guide of claim 22, wherein said enclosure means comprises a tube; and wherein said mounting means comprises at least one section coupled longitudinally to said tube, said section having at least one groove extending longitudinally along substantially the entire length thereof, said cover means being movably fitted edgewise into said groove so as to be movable relative to said section, said groove providing sufficiently seal tight contact with said section for confining said laser beam within said tube.

25. Beam guide of claim 24, wherein said section further comprises an other groove formed substantially in parallel to said one groove so that a mid-section is formed between said grooves, a body of a sufficient cross sectional dimension being fitted into said other groove to force said mid-section towards said one groove to thereby sealingly hold the edge of said cover means within said one groove to prevent said laser beam from escaping from said tube but yet with enough slack to allow said cover means to move relative to said one groove.

* * * * *